(12) United States Patent
Worthington

(10) Patent No.: US 8,944,046 B2
(45) Date of Patent: Feb. 3, 2015

(54) APPARATUS AND METHOD FOR SOLAR ENERGY COLLECTION AND CONVERSION

(76) Inventor: Richard John Worthington, Auldana (AU)

( * ) Notice: Subject to any disclaimer, the term of this patent is extended or adjusted under 35 U.S.C. 154(b) by 0 days.

(21) Appl. No.: 13/702,410

(22) PCT Filed: Jun. 10, 2011

(86) PCT No.: PCT/AU2011/000716
§ 371 (c)(1),
(2), (4) Date: Dec. 6, 2012

(87) PCT Pub. No.: WO2011/153591
PCT Pub. Date: Dec. 15, 2011

(65) Prior Publication Data
US 2013/0074829 A1    Mar. 28, 2013

(30) Foreign Application Priority Data
Jun. 11, 2010    (AU) ................. 2010902580

(51) Int. Cl.
| | |
|---|---|
| *F24J 2/04* | (2006.01) |
| *F24J 2/46* | (2006.01) |
| *F24J 2/48* | (2006.01) |
| *F24J 2/51* | (2006.01) |
| *F24J 2/05* | (2006.01) |
| *F24J 2/10* | (2006.01) |
| *F24J 2/07* | (2006.01) |

(52) U.S. Cl.
CPC ............... *F24J 2/0488* (2013.01); *F24J 2/464* (2013.01); *F24J 2/48* (2013.01); *F24J 2/51* (2013.01); *F24J 2/4623* (2013.01); *F24J 2/055* (2013.01); *Y02B 10/20* (2013.01); *F24J 2/10* (2013.01); *F24J 2002/075* (2013.01); *Y02E 10/40* (2013.01)

USPC ........... 126/600; 126/634; 126/646; 126/657; 126/674; 126/675; 126/702; 126/704; 126/714

(58) Field of Classification Search
CPC ............... F24J 2/04; F24J 2/0483; F24J 2/05; F24J 2/055; F24J 2/06; F24J 2/10; F24J 2/24; F24J 2/244; F24J 2/245; F24J 2/246; F24J 2/247; F24J 2/248; F24J 2/51; F24J 2/54; F24J 2002/1061; F24J 2002/1071; F24J 2002/1095; F24J 2002/501; Y02E 10/41
USPC ......... 126/600, 605, 617, 634, 646, 657, 663, 126/674, 675, 702, 704, 709, 714
See application file for complete search history.

(56) References Cited

U.S. PATENT DOCUMENTS

| | | | |
|---|---|---|---|
| 3,102,532 A * | 9/1963 | Shoemaker | 126/649 |
| 4,217,884 A | 8/1980 | Strong | |
| 4,256,092 A | 3/1981 | Gutermuth | |
| 4,279,240 A * | 7/1981 | Artusy | 126/579 |

* cited by examiner

*Primary Examiner* — Alfred Basichas
(74) *Attorney, Agent, or Firm* — Birch, Stewart, Kolasch & Birch, LLP

(57) ABSTRACT

The present invention relates to a solar energy collector (18) including an outer casing (20) having at least one aperture (22) disposed therein and an absorber (24) disposed within the outer casing (20). The aperture (22) is arranged to receive a beam (16) of solar radiation therethrough so that the beam (16) is incident on the absorber (24). The absorber (24) is arranged in use to absorb the energy of the beam of solar radiation and to thereby convert solar radiation to heat energy to heat a fluid communicated through the absorber (24). The absorber (24) is arranged to be moved by a moving means to promote even heating of the absorber (24).

18 Claims, 3 Drawing Sheets

APPARATUS AND METHOD FOR SOLAR ENERGY COLLECTION AND CONVERSION

This application is the National Stage under 35 USC §371 of International Application PCT/AU2011/000716 filed Jun. 10, 2011, which claims priority under 35 USC §119(a)-(d) of Application Number 2010902580 filed in Australia on Jun. 11, 2010.

FIELD OF THE INVENTION

The present invention relates to apparatus and a method for solar energy collection and conversion.

RELATED APPLICATION

The present application claims priority from Australian provisional patent application 2010902580. The contents of that application are incorporated herein by reference.

BACKGROUND OF THE INVENTION

Solar collectors generally have an absorbing means to absorb the incident solar radiation to convert it to a convenient energy for subsequent use. This can be by heating a fluid passed therethough for applications such as driving a steam turbine or heating a house. However, collectors generally are not very efficient in converting any solar radiation to a convenient energy.

The present invention seeks to provide a more efficient apparatus, method and parts therefore for enabling solar radiation energy conversion.

SUMMARY OF THE INVENTION

According to a first aspect of the present invention there is provided a solar energy collector including an outer casing having at least one aperture disposed therein and an absorber disposed within the outer casing, the aperture is arranged to receive a beam of solar radiation therethrough so that the beam is incident on the absorber, the absorber is arranged to absorb the energy of the incident beam of solar radiation to thereby convert that energy to heat energy to heat a fluid communicated through the absorber, and the absorber is arranged to be moved by a moving means to promote even heating of the absorber.

Even heating of the absorber is desirable as it improves the efficiency of the collector. This is because as the absorber warms up to a temperature higher than the ambient temperature, the absorber gives off a greater part of any accumulated heat energy in the form of long-wave heat rays and as the temperature increases the absorber acquires an increased reflectivity. By ensuring that the entire absorber is heated evenly by the incident beam of solar radiation, more incident energy can be absorbed by the absorber. When spot heating of the absorber occurs, the temperature of the absorber at the heated spot quickly becomes higher than the ambient temperature of the surrounds. This allows a greater local heat radiation from the hotter outer surface of the absorber and an increasing reflection of incident solar radiation because of a local rising reflectivity, thus driving down the overall efficiency of the collector.

In accordance with a preferred embodiment of the invention the absorber is arranged to be rotated about a first axis by the moving means. The moving means is preferably also arranged to translate the absorber along the first axis so that the absorber adopts a sinusoidal motion.

The fluid is preferably communicated through the absorber via a tortuous pathway. Pumping means is preferably provided to regulate the flow of heat transfer fluid through said absorber.

As will be readily appreciated, the outer surface of the absorber will reflect at least some of the incident beam of solar radiation onto an inner surface of the outer casing. The outer surface of the absorber is preferably uneven. The uneven outer surface increases the probability that the reflected beam will be at an angle to the incident beam. Accordingly, there is a great probability that the reflected beam will not be directed back out of the aperture in the outer casing. Hence, the energy of the reflected beam is retained in the collector and not lost to the atmosphere.

The uneven outer surface of the absorber may adopt different forms. For example, the uneven outer surface may be a corrugated surface, either elongate extending along the outer surface of the elongate absorber or horizontally around the girth of the absorber or a combination of both forming a cross hatch of hillocks or it may comprise a plurality of dimples, all to affect an alteration in the angle of reflection of the incident beam of solar radiation.

The absorber preferably includes a core that acts as a heat sink and wherein the fluid communicated through the absorber passes through the core or closely adjacent thereto.

The outer casing of the collector preferably has a reflective inner surface. Insulation may be disposed between the reflective inner surface and an outside surface of the outer casing to help maintain heat energy within the collector and prevent it from being lost to the surrounding atmosphere.

A fenestrated screen is preferably disposed between the outer casing and the absorber. At least one of the plurality of fenestrations formed in the fenestrated screen is arranged to align with the at least one aperture in the collector to allow passage of the incident beam of solar radiation directly onto the absorber.

According to a second aspect of the invention there is provided an absorber including a body with at least one fluid pathway extending therein for communicating fluid through said body, said absorber arranged in use to absorb an incident beam of solar radiation to thereby convert solar radiation energy to heat energy to heat the fluid communicated through the absorber, and said absorber arranged to be moved by a moving means to promote even heating of the absorber.

The invention also provides in a further aspect a method of collecting solar radiation including:

reflecting and concentrating solar radiation along a focal line to form a beam of concentrated solar radiation;

inciding said beam of concentrated solar radiation on an absorber;

absorbing said beam of concentrated solar radiation by said absorber;

converting said concentrated solar radiation to heat energy by said absorber;

communicating a fluid through the absorber to be heated; and moving said absorber to reduce spot temperature of a surface of said absorber.

In one embodiment, the collector further includes a pumping means to regulate the flow of the transfer fluid through the absorber. The pumping means is a pump arranged to regulate the flow of the fluid to achieve a desired temperature of the fluid output from the absorber. The pumping means may also have an important role in regulating pressure of the fluid through the pipe. For instance, if because of heat build up of fluid within the pipe the fluid pressure reaches a critical pressure such as to threaten the integrity of the pipe, more rapid pumping of fluid through the pipe would lead to a cooling of the fluid within the pipe.

The heat transfer fluid will typically be water. However, it will be appreciated by those skilled in the art, that the fluid employed as a heat transfer fluid may vary depending on the needs of the system. For example, molten salts may be pumped through the absorber in a high temperature solar thermal collection system. It is also to be appreciated that the fluid may be a gaseous medium communicated through the absorber.

In one arrangement the absorber is an elongate hollow ended cylinder. Such a configuration provides a greater contact area by which to heat the fluid passing through the absorber than if a compact cylinder was used. The elongate cylinder is of sufficient diameter to maximise its efficiency with respect to the dimensions of the collector casing.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS OF THE INVENTION

Figure 1:
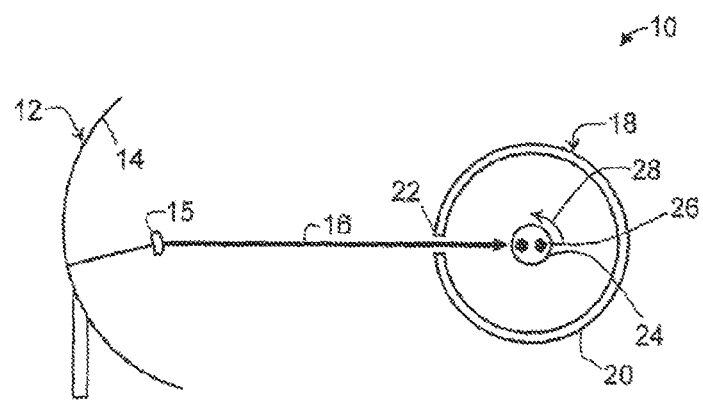
FIG. 1 is a schematic view of a system for solar thermal collection according to an embodiment of the present invention.

FIG. 1 schematically illustrates a system 10 for solar thermal energy collection. The system 10 includes a reflector 12 with a dished surface 14 arranged to reflect and concentrate solar radiation along a focal line to form a beam 16 of solar radiation. The system 10 also includes a collector 18 with an outer casing 20 having an aperture 22 disposed therein. The collector 18 includes an absorber 24 disposed within the outer casing 20.

The beam of solar radiation 16 is arranged to pass through the aperture 22 of the collector 18 onto the absorber 24. The absorber 24 is arranged to absorb the beam 16 of solar radiation, to convert solar radiation to a convenient energy, such as heat energy, and to heat a medium, such as a fluid communicated therethrough. As illustrated, fluid is communicated through the absorber 24 via a passageway formed by pipes 26.

The absorber 24 is arranged to be rotated about its longitudinal axis to promote even heat distribution in the absorber 24 and to prevent spot heating. That is, on a stationary absorber that part of the surface directly receiving the incident beam 16 will have a spot temperature much higher than the remainder of the surface of the stationary absorber. This results locally in an increase in heat radiated from the hotter outer surface of the absorber into the collector external to the absorber and away from its desired destination that is internal to the absorber. It also results in an increase in the reflectivity of that part of the absorber, reducing desired absorbability to the interior of the absorber by both of these processes and thereby reducing the amount of heat energy available for transfer to the fluid communicated through the absorber.

It is envisaged that alternatively or in addition to rotating or pivoting the absorber 24 about its longitudinal axis, the absorber 24 may be translated back and forth along its longitudinal axis. Indeed the absorber 24 may be moved in any suitable manner to promote even application of the incident beam 16 to the surface of the absorber 24 and/or even heating of the absorber 24. It is envisaged that it may be advantageous to move the absorber 24 so as to adopt a generally sinusoidal motion.

As previously described, the absorber 24 converts the incident solar radiation to heat energy to thereby heat transfer fluid communicated through the absorber 24. The movement of the absorber 24 reduces the spot temperature of the surface of the absorber 24 to increase the absorbability of the absorber 24 which may, in turn, increase the volume of fluid that can be heated to a designated temperature and/or increase the temperature of that fluid. The heated fluid, such as super-heated steam, can then be used to generate electricity using conventional methods, such as a steam turbine. It is to be appreciated by those skilled in the art that other applications may be implemented using the system 10, such as heating houses, swimming pools, etc.

As shown in FIG. 1, the beam 16 of solar radiation reflected from the dished surface 14 is collimated using a convex lens 15 disposed distally to the dished surface 14 just distal to the focal point of the dished surface 14. As depicted, the convex lens 15 may be a plain convex lens with one plain surface and one convex surface or it may have both convex surfaces or it may be a Fresnel lens. A Fresnel lens would have the advantage of reduction of the absorption of solar radiation within the lens 15 itself, but it would have the disadvantage of some of the concentrated beam of solar radiation being distorted, and not parallel.

The convex lens 15 collimates the reflected solar radiation into the beam 16 which is directed through the aperture 22 in the outer casing 20 of the collector 18 to incide on the absorber 24.

Those skilled in the art will appreciate that the incident beam 16 can be established in other ways. The present invention is not limited to any particular manner for establishing the incident beam that is directed onto the absorber 24.

Figure 1A:
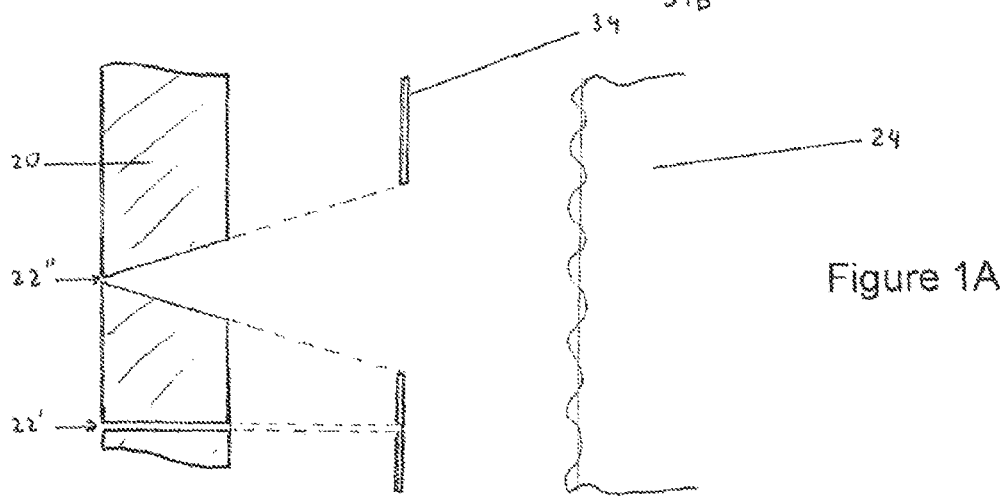
FIG. 1A schematically illustrates a straight bore aperture in a collector according to an embodiment of the invention and an angled bore aperture.

The aperture 22 in the collector 18 may adopt different configurations. For example, as shown in FIG. 1A, the aperture 22 may be formed as a straight bore aperture 22' or an angled bore aperture 22". If a straight bore aperture 22' is provided in the collector 18 then only an incident beam extending parallel to the bore of the aperture 22' will pass through to incide on the absorber 24. When an angled bore aperture 22" is used, incident beams over the range of the angle of the angled bore will be able to pass through the aperture 22" to incide on the absorber 24. An angled bore aperture 22" may be preferable when multiple beams of incident solar radiation are to be passed through the aperture 22.

Although the shape of the aperture 22 may vary, the overall size of the aperture 22 should be controlled to minimise the amount of energy lost out of the collector 18 (i.e. via reflection) as compared to the amount of energy from the incident beam or beams 16 passing through the aperture 22 and onto the absorber 24. Increased efficiency of the collector 18 is obtained by maximising the amount of heat energy "trapped" within the collector 18.

Figure 2:
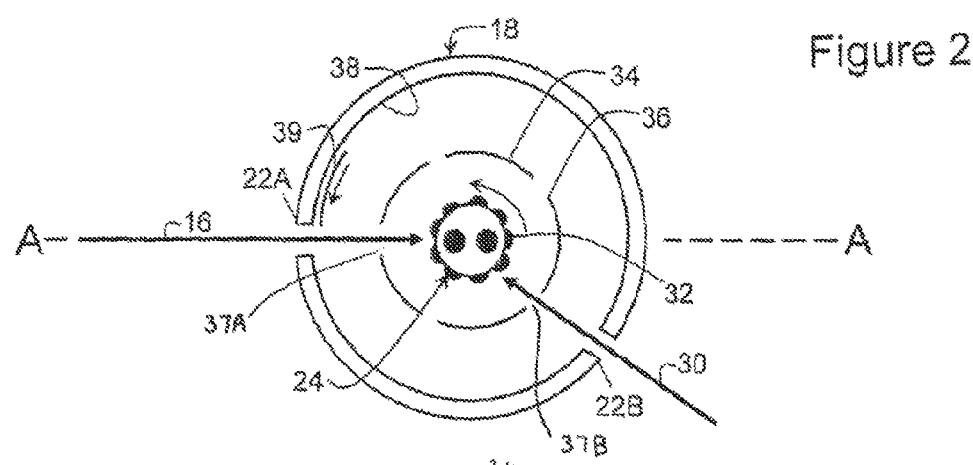
FIG. 2 is a top cross sectional view of a collector according to an embodiment of the present invention.

Another embodiment of the collector 18 is shown in FIG. 2. In this embodiment, the outer casing 20 of the collector 18 has an additional aperture 22B to the aperture 22A to allow a further beam 30 of solar radiation to be incident on the absorber 24. It will be appreciated by those skilled in the art, that the outer casing 20 may have a plurality of apertures 22 to receive further beams of incident solar radiation.

The collector 18 shown in FIG. 2 includes a fenestrated screen 34 disposed between the outer casing 20 and the absorber 24. The fenestrated screen 34 has a plurality of fenestrations 36, 37A, 37B. Some of the fenestrations 37A, 37B will be aligned with the apertures 22A and 22B to allow direct passage of the respective beams 16, 30 of solar radiation onto the absorber 24. The remaining fenestrations 36 allow passage by randomization of solar radiation reflected from a highly reflective inner surface 38 of the outer casing 20 ultimately onto the absorber 24.

It will be appreciated by those skilled in the art that the fenestrated screen 34 serves the useful purpose of stopping some radiation reflected or emitted from the absorber 24 and reflecting it back on to the absorber 24. Radiation that passes from the absorber 24 and through a fenestration is largely reflected back ultimately on to the absorber 24 through a fenestration by the process of randomization.

The fenestrations 36, 37A, 37B may adopt different configurations. For example, the fenestrations 36, 37A, 37B may be circular or square apertures or may be elongated apertures extending either horizontally or vertically with respect to the longitudinal axis of the absorber 24.

In an arrangement where a plurality of concentrators are aligned horizontally and their resultant concentrated beams of parallel solar radiation are caused to pass through a single portal in the collector's outer casing 20 then the fenestration that allows the passage unimpeded of such beams would be an elongate horizontal fenestration. In another example a plurality of vertically aligned concentrators where the resultant beams were to pass through a single portal would demand an elongate vertical fenestration.

The absorber 24 also includes an uneven outer surface 32 so that solar radiation incident on the absorber 24, and which is not absorbed by the absorber 24, is reflected away from its original pathway (i.e. at an angle to the beams 16,30). This arrangement is preferred to ensure that the reflected radiation is not reflected back out of the collector 18 via the apertures 22A and 22B to be lost to the atmosphere. As stated previously, the objective being to retain, in so far as possible, all of the energy of the incident beams 16, 30 within the collector 18 so that it can ultimately be used to heat the fluid passing through the absorber 24.

Reflected solar radiation off the absorber 24 is incident on the fenestrated screen 34 and is either reflected back onto the absorber 24 or will pass through the fenestrations 36 in the fenestrated screen 34. Radiation that passes through the fenestrations 36 will then be incident on the inner surface 38 of the outer casing 20 to be reflected back onto the absorber 24 by randomization through a fenestration 36 of the fenestrated screen 34. It will thus be appreciated that the incident beam 16 will be reflected off various surfaces of the collector 18 and/or fenestrated screen 34 and/or absorber 24 until it is directed onto and absorbed by the absorber 24. The incident beam 16 is therefore "trapped" inside the collector 18 maximising the energy transfer possible to the fluid communicated through the absorber 24.

The inner surface 38 of the outer casing 20 is highly reflective (e.g. polished steel) to better reflect any incident solar radiation back onto the absorber 24 through the fenestrations 36 in the fenestrated screen 34. Also, the fenestrated screen 34 has highly reflective surfaces (e.g. polished steel) to ultimately reflect incident solar radiation back onto the absorber 24. It is also to be appreciated by those skilled in the art that the fenestrated screen 34 and the outer casing 20 retain heat in the collector 18 to heat the absorber 24 via convection and air conduction. Accordingly, the outer casing 20 of the collector 18 has insulation disposed between the reflective inner surface 38 and an outside surface of the outer casing 20 to further retain heat in the collector 18.

In an embodiment, the outer casing includes thick insulation that enshrines a highly reflective inner surface (e.g. polished steel). The heat insulation opposes the transmission of heat that is absorbed by the inner surface and transmitted to the insulation and opposes radiation or heat that enters a portal imperfectly and is absorbed by the insulation. Thus there is a gradient of heat across the insulation from hot internally to a lower temperature externally. If the outer surface of the outer casing were to become excessively hot, the heat insulation must be regarded as being inadequate or inappropriate and having failed.

It will be appreciated by those experienced in the art that the insulation is important in maintaining the entrapment of all types of radiation within the collector. If any cooling of the insulation is attempted for example by pumping a fluid (e.g. water) through the insulation, the resultant cooling of the outer casing would encourage more heat loss from the interior of the collector.

The collector 18 may include retractable shutters 39 arranged to selectively close the apertures 22A, 22B to stop the conversion of solar radiation to heat energy by the absorber 24 if the fluid communicated through the absorber 24 reaches a maximum operating temperature or if the system is in danger of overheating and damaging itself. In this case, each shutter 39 may also have a reflective outer surface to reflect the incident solar radiation to minimise the absorption of heat energy in the collector 18. In an arrangement not shown, the shutters 39 are arranged to be operated externally to the collector 18.

Figure 3:
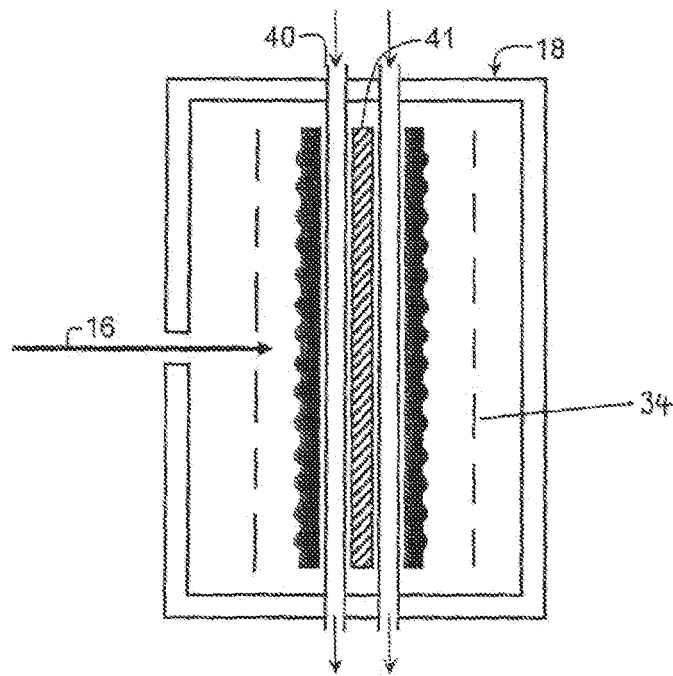
FIG. 3 is a cross sectional view of the collector taken from A-A of FIG. 2.

FIG. 3 shows a side cross sectional view of the collector 18 shown in FIG. 2 taken along A-A. The absorber 24 encases a pipe or pipes 40, two being illustrated by way of example, for communicating fluid through the length of the absorber 24. The absorber 24 also encases an elongate core 41, that has both high absorbability and conductivity and it may be made of, for example, copper or bronze, to retain heat energy transmitted from the absorber 24 to further heat the fluid in the pipe or pipes 40 by conduction.

The absorber 24 is an elongate hollow ended cylinder encasing parallel pipes 40. However, it is envisaged that the pipes 40 may be convoluted, such as having a helical shape, to increase the surface area of the pipes 40 in near contact with the absorber 24 to increase the volume of fluid that can be heated to a designated temperature.

The absorber may be made from materials such as copper, cast iron or bronze so as to be highly absorbent. The surface of the absorber is preferably configured to discourage reflection and may include a surface coating to increase the degree of absorption.

As described, the absorber 24 is arranged to be moved to promote even heat distribution and to prevent hot spots forming on the absorber 24. The movement of the absorber 24 may be achieved by any suitable method. Methods for applying rotational movement to an object are well known and as such will not be described in detail. For example, a simple motor could be used to rotate the absorber 24 in a clockwise or anti-clockwise direction about its longitudinal axis.

To maintain the absorber 24 with a consistent surface temperature in a vertical direction, in addition to a circumferential direction, the absorber 24 may be moved by an appropriate mechanism back and forth along the longitudinal axis of the absorber 24. Again, methods for providing such a range of motion to an object are well known and as such are not described herein It is envisaged that a preferred embodiment of the invention would include an absorber 24 that is rotated, translated and/or rotated and translated as required to promote even heating of the surface of the absorber 24.

Sensors (not shown) may be disposed to monitor the internal temperature of the collector to ensure that an optimized operating temperature is achieved and maintained. The sensors may be located, for example, within the central core, within the piping, between the outer casing and the absorber and on the absorber.

A control system may be provided to receive input from the sensors and to then control the pumping speed of the fluid to be heated. The control system may also or alternatively control movement of the absorber 24 to optimise the heating pattern of the absorber 24 and/or the operation of the shutter system 39 to reduce and/or close down the solar radiation input into the collector 18.

Figure 4:
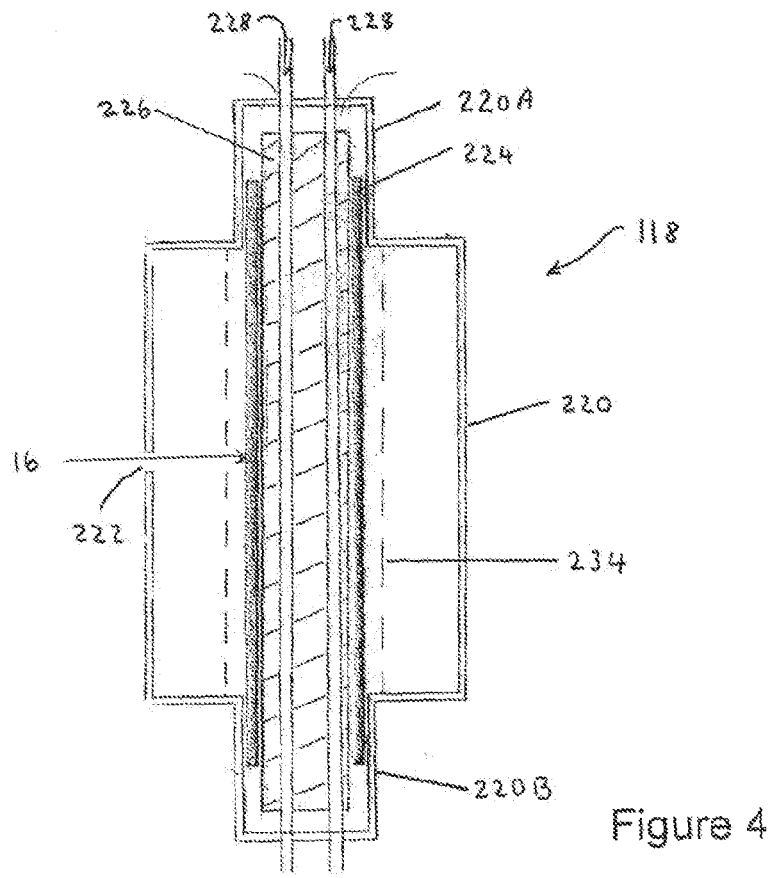
FIG. 4 is a cross sectional view of a collector according to a further embodiment of the invention.

FIG. 4 illustrates a collector 118 according to a further embodiment of the invention. The collector 118 includes an outer casing 220 having an aperture 222 disposed therein which is arranged to receive a beam 16 of incident radiation. The inside surface of the casing 220 is highly polished to encourage reflection of any incident radiation.

Mounted within the casing 220 of the collector 118 is an absorber 224. The absorber 224 is a hollow ended cylindrical member which is arranged for rotation and oscillation to prevent spot heating of the absorber 224 due to the incident beam 16 of radiation. The absorber 224 has a dull finish to hamper reflection.

A cylindrical core 226 of a highly conductive material (e.g. copper, bronze) is located within and proximate to the inner surface of the movable absorber 224. The elongate core is provided to retain converted heat energy.

The core 226 is stationary and contains passageways 228 through which a heat transfer fluid is pumped or otherwise arranged to flow. The transfer fluid is heated as it passes through the core 226 and can thereafter be used to heat a home or drive a steam turbine etc.

Although not depicted, the passageways 228 may adopt a tortuous path so that the time spent by the heat transfer fluid within the core 226 is maximised to promote heating.

A fenestrated screen 234 is fixedly mounted within the casing 220 and about the absorber 224.

As shown in FIG. 4, the casing 220 may include upper and lower portions 220A, 220B into which the absorber 224 and core 226 may extend. The fenestrated screen 234 does not extend into the upper and lower portions 220A, 220B. The casing 220 forms a chamber about the absorber 224.

Figure 5:
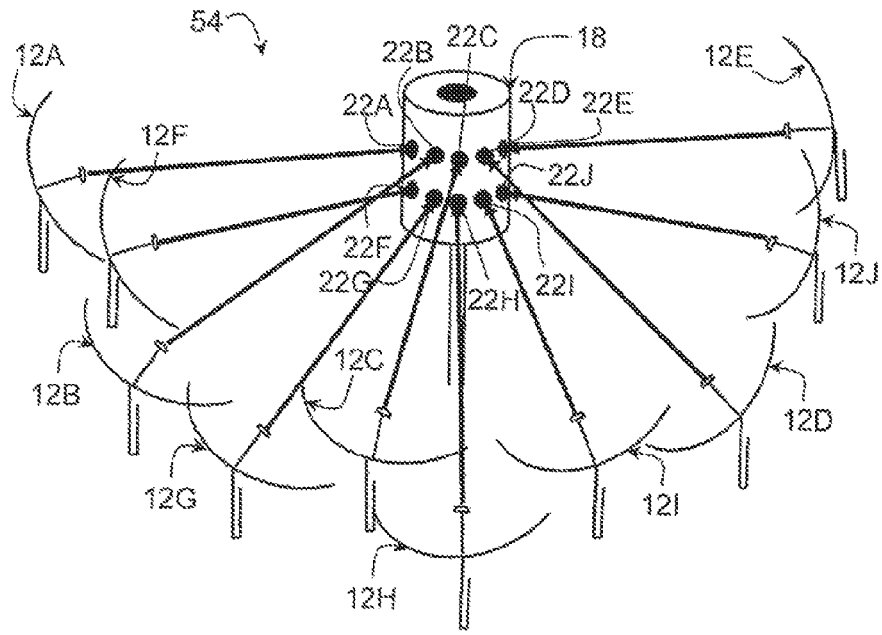
FIG. 5 is a schematic representation of a system for solar thermal collection having a plurality of reflectors according to another embodiment of the present invention.

FIG. 5 shows another system for solar thermal collection where the collector 18 has a plurality of apertures 22A to 22J arranged to receive corresponding beams of solar radiation from a plurality of reflectors 12A to 12J. In this embodiment, the reflectors 12A to 12J are arranged circumferentially around the centrally located collector 18 to receive solar radiation and concentrate and reflect it on to the collector 18. The reflectors 12A to 12J are arranged in horizontal rows with a first row of reflectors 12A to 12E having a greater vertical height than a second row of reflectors 12F to 12J. In this case, the first row of reflectors 12A to 12E are arranged to reflect beams of solar radiation to a first row of corresponding apertures 22A to 22E disposed circumferentially on the collector 18 above a second row of apertures 22F to 22J arranged to receive beams of solar radiation from the second row of reflectors 12F to 12J. It will be appreciated by those skilled in the art that more than two rows of apertures may be disposed in the collector 18 and more than one reflector may be arranged to reflect beams of solar radiation through the same aperture.

Figure 6:
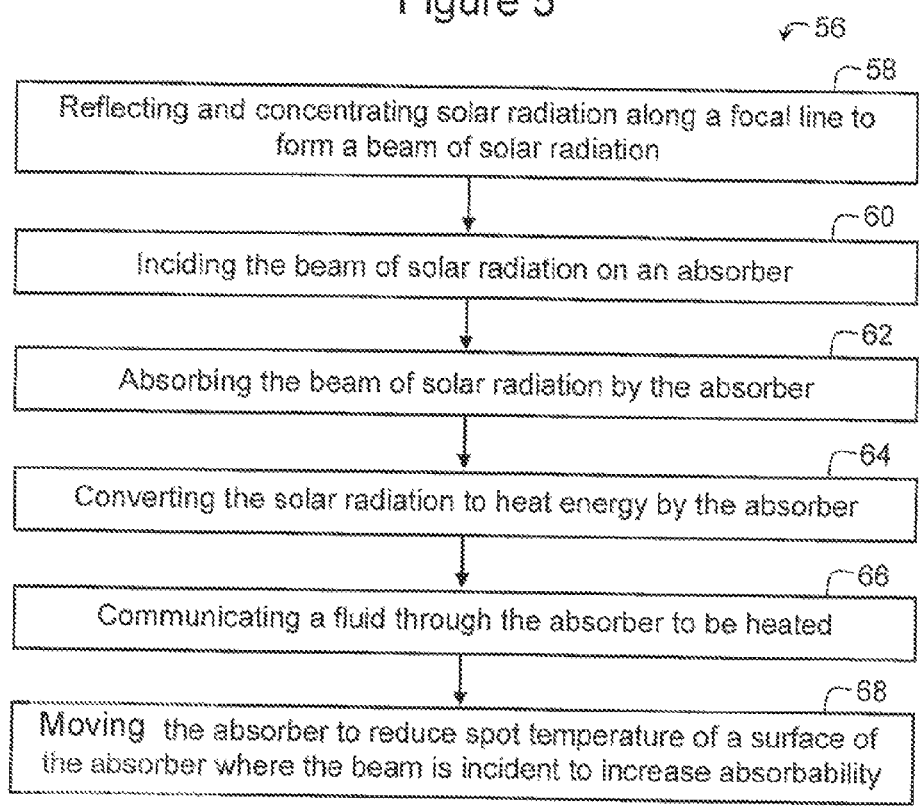
FIG. 6 illustrates a method of collecting solar radiation according to an embodiment of the present invention.

FIG. 6 depicts a method for collecting solar radiation. The method 56 includes the step 58 of reflecting and concentrating solar radiation along a focal line to form a beam of concentrated solar radiation, the step 60 of inciding the beam of solar radiation onto an absorber, and the step 62 of absorbing the concentrated beam of solar radiation by the absorber. The method 56 further includes the step 64 of converting the solar radiation to heat energy by the absorber, the step 66 of communicating a fluid through the absorber to be heated by this converted heat energy and the step 68 of moving the absorber to reduce spot temperature (i.e. not creating excessive high temperature hot spots) on the surface of the absorber where the beam is incident and therefore to increase the absorbability of the absorber and thus increase the efficiency of the conversion of solar radiation to heat energy.

It will be appreciated that in accordance with the described embodiments of the invention, a beam of concentrated solar radiation is directed to pass cleanly through a small aperture or portal in the collector. This is done with high precision and once inside the collector the radiation can only escape with great difficulty. The resultant effect is that almost all the incident solar radiation is eventually converted to heat energy which can be used to heat the transfer fluid.

In accordance with a preferred embodiment, the collector is a cylindrical structure that has highly reflective internal walls (e.g. polished steel) and a central absorber that is of dull finish that causes the entrapped solar radiation to be preferentially absorbed by the absorber. The absorber both rotates and oscillates producing a sinusoidal motion to promote even heating of the absorber. The absorber adopts the form of a hollow ended cylinder that completely surrounds, and is in intimate contact with a cylindrical block of material having high heat absorbability and conductivity (e.g. a copper block). A passageway for heat transfer fluid extends through the block. In one form, the passageway is established by a pipe or pipes that may have a helical configuration. The transfer fluid is pumped through the pipes to be heated.

The absorber is arranged to move whilst the block is fixed. As the absorber heats it acts as a radiator and radiates heat to its surroundings. This means that in addition to heating the block of material containing the fluid passageway, the absorber will radiate heat to the cylindrical structure of the collector.

Heat radiated externally from the absorber meets the highly reflective internal wall of the collector and is then reflected back onto the absorber. This process repeats so that as far as reasonably possible, and noting that there will always be some inefficiencies and losses in the system, incident radiation that enters the collector via the aperture is ultimately absorbed by the absorber and then used to heat the transfer fluid. This arrangement establishes a high degree of efficiency for the conversion of the incident beam of solar energy into heat energy that is ultimately used to heat the transfer fluid.

The collector is preferably well insulated externally to prevent any heat that is created in the reflective process off the inner wall, or radiation that is reflected imperfectly back through a portal or aperture, from escaping externally from the collector. The aim being to trap any radiation or heat so as to allow that radiation or heat to act as a buffer to prevent further heat escaping the interior of the collector 20.

A fenestrated screen is preferably employed within the collector. In one form, the screen includes a hollow ended cylindrical member with highly polished surfaces on both sides. The screen's fenestrations are designed to allow the passage of the incident concentrated beam of solar radiation directly on to the absorber. A significant amount of incident radiation reflected from the absorber and radiation emitted by the absorber is reflected by the screen directly back onto the absorber or indirectly by further reflection from the innermost surface of the screen back onto the absorber. The portion of radiation that passes through the screen's fenestrations meets the inner wall of the collector and is reflected within the collector until it randomly passes back through a fenestration to ultimately meet the absorber and be absorbed. This system cannot be perfect, for instance some energy is lost in the reflection process and turned to heat that may slowly be lost through an insulated outer wall of the collector. Thus solar energy that enters the collector is largely ultimately absorbed and a small portion otherwise dissipated.

The absorber has an irregular surface (e.g. a corrugated surface) that discourages any incident radiation, that is reflected and not absorbed, from being reflected back along the same path as its entrance, in that case being able to exit via its same entrance and be lost to the atmosphere. The aim being to prevent any reflected energy from exiting the collector via its same small aperture or portal of entry into the collector.

In an alternative arrangement, the collector may include an inner wall and an outer wall with a space there between for receiving a flow of transfer fluid. The transfer fluid being pumped through the space and heated as it moves therethrough. The inner wall would have a dull and absorptive internal surface and the outer wall would be well insulated to prevent heat loss from the space.

In a further alternative, the container may include a wall with a transfer fluid pathway defined therein. The pathway may be formed by a conduit or tube that runs within the wall of the container.

In accordance with any arrangement where heat transfer fluid travels through a space or pathway(s) in the container walls, the aperture or apertures in the container are configured so as to be isolated from the space or pathway(s)

A method of solar concentration preferred by the inventor is to use two opposed three-dimensional parabolic structures of highly reflective inner surfaces, one large and one small. The configuration of these structures is such that parallel solar radiation is brought to a focal point after reflection from their inner surface. The primary parabolic reflector is large and collects solar radiation along its focal line at its focal point, whereupon the radiation again diverges to be met by the small secondary parabolic reflector distal to the focal point of the primary reflector. The primary and secondary reflectors share a common focal line [although in opposite directions] and a common focal point. The end result is that parallel concentrated radiation passes from the secondary parabolic reflector along the common focal line to exit through an aperture in the primary parabolic reflector at its pole. Should higher concentrations of radiation be required the system is able to replicate itself to do this. Plain mirrors then direct the concentrated beam to a portal in the collector. If radiation concentration is high it may be necessary to employ a cooling system behind the reflective surface of all reflectors receiving such high concentrated radiation.

Such a concentrator arrangement is able to be "closed off" by a plain sheet of glass of high translucency or a plain sheet of synthetic material of high translucency at its collecting face and at its pole, where there exists an aperture, to form a "sealed unit". This may have major advantages in maintenance of such a concentrator ensuring its reflective surfaces are clean and remain highly reflective.

As a variation instead of being sealed at the pole of the primary parabolic reflector the "sealed unit" might be sealed distally e.g. past the first directing plane mirror or distal to subsequent directing mirrors.

It will be understood by persons skilled in the art that many modifications may be made without departing from the spirit and scope of the invention.

Throughout the description and claims of this specification, the word "comprise" and variations of the word, such as "comprising" and "comprises", is not intended to exclude other additives, components, integers or steps.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of each claim of this application.

The invention claimed is:

1. A system for collecting solar radiation comprising:
  (i) a solar energy collector comprising an outer casing having an aperture disposed therein and an absorber disposed within the outer casing, the aperture is arranged to receive a beam of collimated concentrated solar radiation therethrough so that the beam is incident on the absorber, the absorber is arranged to absorb the energy of the incident beam of collimated concentrated solar radiation to thereby heat a medium communicated through the absorber, and the absorber is arranged to be moved by a mover to promote even heating of the absorber,
  (ii) a primary parabolic reflector, and
  (iii) a lens or a secondary parabolic reflector configured to collimate solar radiation reflected from the primary reflector;
  wherein the collector, primary parabolic reflector and lens or secondary parabolic reflector are arranged such that, in use, the beam of collimated concentrated solar radiation is directed through the aperture of the outer casing to incide on the absorber of the solar energy collector.

2. The system of claim 1, comprising a secondary parabolic reflector, wherein the primary parabolic, reflector comprises an aperture at its pole such that, in use, the beam of collimated concentrated solar radiation passes from the secondary parabolic reflector to exit through the aperture in the primary parabolic reflector at its pole.

3. The system of claim 1, wherein the solar energy collector outer casing comprises at least two apertures, each of the apertures arranged to receive a beam of collimated concentrated solar radiation therethrough.

4. The system of claim 1, wherein the collector comprises a reflective fenestrated screen disposed between the outer casing and absorber.

5. The system of claim 4, wherein the reflective fenestrated screen has a plurality of fenestrations and at least one of said plurality of the fenestrations is aligned with the aperture in said collector to allow passage of said beam of collimated concentrated solar radiation to incide on the absorber of the collector.

6. The system of claim 4, wherein the inner surface of the collector outer casing is reflective, and the aperture, outer casing, fenestrated screen and absorber of the collector are dimensioned and arranged such that:
(i) most of the heat energy radiated externally from the absorber is radiated onto the reflective inner surface of the outer casing and also the fenestrated screen causing most of the heat energy radiated externally from the absorber being retained in the collector and/or
(ii) most of the incident beam of the collimated concentrated solar radiation reflected by the outer surface of the absorber is reflected onto the reflective inner surface of the outer casing and also the fenestrated screen causing the energy of the reflected beam being retained in the collector.

7. The system of claim 1, wherein the inner surface of the collector outer casing is reflective, and the aperture, outer casing, and absorber of the collector are dimensioned and arranged such that:
(i) most of the heat energy radiated externally from the absorber is radiated onto the reflective inner surface of the outer casing causing most of the heat energy radiated externally from the absorber being retained in the collector and/or
(ii) most of the incident beam of collimated concentrated solar radiation reflected by the outer surface of the absorber is reflected onto the reflective inner surface of the outer casing.

8. The system of claim 1, wherein the absorber of the collector is arranged to be rotated by the mover.

9. The system of claim 1, wherein the absorber of the collector is arranged to be translated along a first axis by the mover.

10. The system of claim 1, wherein the mover moves the collector absorber so that the absorber adopts a sinusoidal motion.

11. The system of claim 1, wherein the medium is communicated through the collector absorber via at least one tortuous pathway.

12. The system of claim 1, wherein the system further comprises a pump to regulate flow of said medium through said absorber.

13. The system of claim 1, wherein the outer surface of the collector absorber is configured to reflect any unabsorbed portion of the incident beam of collimated concentrated solar radiation onto an inner surface of the collector.

14. The system of claim 1, wherein the outer casing of the collector includes heat insulation disposed between the reflective inner surface and an outside surface of the outer casing.

15. The system of claim 14, wherein heat insulation is provided within the outer casing of the collector.

16. The system of claim 1, wherein the outer casing of the collector substantially surrounds the absorber.

17. A method of collecting solar radiation comprising:
providing the system of claim 1;
reflecting, concentrating and collimating solar radiation along a focal line to form a beam of collimated concentrated solar radiation;
inciding said beam of collimated, concentrated solar radiation on the absorber;
absorbing said beam of collimated concentrated solar radiation by said absorber;
converting said collimated concentrated solar radiation to heat energy by said absorber;
communicating a medium through the absorber to be heated; and
moving said absorber to promote more even heating of the external surface of said absorber.

18. A solar energy collector including an outer easing having at least two apertures disposed therein, an absorber disposed within the outer casing, and optionally a fenestrated screen disposed between the outer casing and the absorber, each of the apertures of the outer casing arranged to receive a beam of concentrated solar radiation therethrough so that each of the beams is incident on the absorber, the absorber is arranged to absorb the energy of each of the incident beams of solar radiation to thereby convert that energy to heat energy to heat a fluid communicated through the absorber, and the absorber is arranged to be moved by a mover to promote even heating of the absorber, wherein the apertures, outer casing, optional fenestrated screen, and absorber are dimensioned and arranged such that:
(i) most of the heat energy radiated externally from the absorber is radiated onto a reflective inner surface of the outer casing and also the fenestrated screen, if present, causing most of the heat energy radiated externally from the absorber being retained in the collector and/or
(ii) most of each of the incident beams of solar radiation reflected by the outer surface of the absorber is reflected onto a reflective inner surface of the outer casing and also the fenestrated screen, if present, causing the energy of each of the reflected beams being retained in the collector.

\* \* \* \* \*